the standard

United States Patent Office 3,222,392
Patented Dec. 7, 1965

3,222,392
N-METHYL 2,2-DIPHENYL-3-HYDROXYPROPYL CARBAMATE
Frank M. Berger, Princeton, and Bernard J. Ludwig, North Brunswick, N.J.
No Drawing. Filed Sept. 28, 1961, Ser. No. 141,315
1 Claim. (Cl. 260—482)

This invention relates to a novel compound and methods of manufacture. The invention has for its object the provision of a new compound possessing unique muscle relaxant activity.

The compound of this invention is N-methyl-2,2-diphenyl-3-hydroxypropyl carbamate and has the following chemical structure:

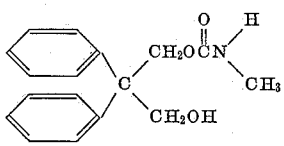

This compound is a white crystalline solid, melting at 87–89° C., and has a limited solubility in water. It is soluble in common organic solvents and stable to mild alkali and acidic conditions. Under vigorous hydrolytic conditions, using strong alkali or acid, this compound is converted to 2,2-diphenyl-1,3-propanediol, methylamine and carbon dioxide.

A number of methods are now given for preparing the compound of this invention. One method of preparation of the compound of this invention involves (a) conversion of 2,2-diphenyl-1,3-propanediol to the corresponding cyclic carbonate ester (m-dioxanone) using phosgene and a suitable acid acceptor or diethylcarbonate, and (b) treatment of the cyclic carbonate ester with anhydrous or aqueous solutions of methylamine. The aforedescribed reactions are summarized in the following two-step reaction scheme:

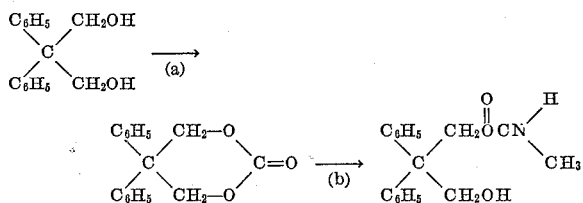

Examples for the preparation of the intermediate dioxanone are given in Examples A and B which follow, while Examples 1 and 2 are examples of converting the dioxanone to the compound of this invention using anhydrous methylamine (Example 2) or aqueous solutions of methylamine (Example 1).

EXAMPLE A

*Preparation of 5,5-diphenyl-1,3-dioxan-2-one using diethylcarbonate*

68.4 g. of 2,2-diphenyl-1,3-propanediol and 35.4 g. of diethylcarbonate are added to 750 ml. of xylene in a suitable vessel equipped with an efficient distillation column. A small volume of xylene is distilled from the mixture to remove traces of water from the reaction mixture. The mixture is cooled and 1 g. of metallic sodium, previously dissolved in 5 ml. of anhydrous ethanol, is added. The mixture is heated to distillation temperature and the azeotrope of ethanol and xylene is removed. When substantially the theoretical quantity of azeotrope has been recovered, the residual xylene is removed by distillation under reduced pressure. The solid residue remaining is purified by crystallization from trichloroethylene to give 44 g. (58% of theory) of 5,5-diphenyl-1,3-dioxan-2-one, melting point 156–158° C.

EXAMPLE B

*Preparation of 5,5-diphenyl-1,3-dioxan-2-one using phosgene*

A mixture consisting of 95 g. of 2,2 - diphenyl - 1,3-propanediol, 79 g. of pyridine and 1.75 liters of ethyl ether is placed in a suitable vessel equipped with an efficient stirrer, condenser and gas inlet tube. 39 g. of gaseous phosgene are added at a rate sufficient to maintain slow reflux. Stirring is continued for an additional hour after addition is complete. The solid formed in the reaction is removed by filtration, washed with ether and with dilute hydrochloric acid. It is dried and purified by crystallization from trichloroethylene. 56 g. (55%) of 5,5-diphenyl-1,3-dioxan-2-one, melting point 156–158° C., are obtained.

EXAMPLE 1

*Preparation of N-methyl-2,2-diphenyl-3-hydroxypropyl carbamate using aqueous methylamine*

152 g. of 5,5-diphenyl-1,3-dioxan-2-one and 750 ml. of 40% aqueous methylamine are added to 750 ml. of ethanol and the mixture refluxed for 5 hours. The solvents and excess amine are removed by distillation under reduced pressure. The residue is dissolved in a sufficient volume of ethyl ether, the solution washed with dilute hydrochloric acid, saturated sodium chloride solution and water. The ether solution is dried over a suitable drying agent and the ether removed by distillation. Purification of the residue is effected by dissolving in trichloroethylene and adding hexane, followed by cooling. Further purification is accomplished by crystallization from toluene. 115 g. (67% of theory) of crystalline solid melting point 87–89° C., is obtained.

*Analysis.*—Calculated $C_{17}H_{19}NO_3$, N—6.71%. Found, N—6.75%.

EXAMPLE 2

*Preparation of N-methyl-2,2-diphenyl-3-hydroxypropyl carbamate using anhydrous methylamine*

A mixture of 58 g. of 5,5-diphenyl-1,3-dioxan-2-one and 800 ml. toluene is placed in a suitable vessel equipped with an efficient condenser, stirrer and gas addition tube. The mixture is heated until a clear solution is obtained. The heat is removed and an excess of gaseous anhydrous methylamine is directed into the solution. The mixture is stirred under reflux during the addition and for an additional hour. Approximately one-third of the toluene solvent is removed by distillation and the remaining solution allowed to stand under refrigeration. 56 g. (85% of theory) of product is obtained, having the same physical properties as described in Example 1.

As indicated hereinbefore, the novel compound of this invention possesses unexpected muscle relaxant activity. In order to show the muscle relaxant activity of the compound of this invention, the mean paralyzing dose ($PD_{50}$) and the mean lethal dose ($LD_{50}$) for the compound of this invention and the $PD_{50}$ and $LD_{50}$ doses of (1) meprobamate (2-methyl-2-n-propyl-1,3-propanediol dicarbamate), a known muscle relaxant, and (2) carisoprodol (N - isopropyl - 2 - methyl - 2 - n - propyl - 1,3 propanediol dicarbamate) a widely used muscle relaxant, when administered intraperitoneally to mice, are reported in Table I. The $PD_{50}$ and $LD_{50}$ doses or values are expressed in milligrams per kilogram of animal weight, and the standard error of the dose is also given.

TABLE I.—ACUTE PARALYZING AND LETHAL DOSES
[Milligrams per kilogram]

|  | N-methyl-2,2-diphenyl-3-hydroxypropyl carbamate | | Meprobamate | | Carisoprodol | |
|---|---|---|---|---|---|---|
|  | $PD_{50}$ | $LD_{50}$ | $PD_{50}$ | $LD_{50}$ | $PD_{50}$ | $LD_{50}$ |
| Mice, i.p. | 120±11.2 | 900±83 | 235±7 | 800±15 | 165±17 | 980±78 |

From the results reported in Table I, it is seen that the compound of this invention is more effective than meprobamate or carisoprodol in causing muscle relaxation paralysis) in mice by the intraperitoneal route. The compound of the invention is somewhat less toxic than meprobamate, and is of the same order of toxicity as carisoprodol. However, the somewhat greater activity results in the safety ratio in the mouse which is greater than 6.0, and compares favorably with that of meprobamate or carisoprodol.

In view of the results reported in Table I, it may be said that the compound of this invention possesses significant muscle relaxant properties as evidenced by the aforedescribed experiments in mice.

What is claimed is:
N-methyl-2,2-diphenyl-3-hydroxypropyl carbamate.

References Cited by the Examiner

UNITED STATES PATENTS

| 2,656,378 | 10/1953 | Berger et al. | 260—482 |
| 2,724,720 | 11/1955 | Berger | 260—482 |
| 2,770,649 | 11/1956 | Murphey | 260—482 |
| 2,814,637 | 11/1957 | Marshall et al. | 260—482 |
| 2,816,910 | 12/1957 | Junkmann et al. | 260—482 |
| 2,937,119 | 5/1960 | Berger | 260—482 X |
| 2,976,213 | 3/1961 | Murphey | 167—65 |
| 2,991,225 | 7/1961 | Harms et al. | 167—65 |
| 3,068,278 | 12/1962 | Bernstein | 260—482 |
| 3,081,341 | 3/1963 | Mooradian | 260—482 |

OTHER REFERENCES

Miltown, published by Wallace Laboratories, New Brunswick, N. J., in 1955.

LORRAINE A. WEINBERGER, *Primary Examiner.*

ABRAHAM H. WINKELSTEIN, DANIEL D. HORWITZ, LEON ZITVER, *Examiners.*